United States Patent
Childers et al.

(10) Patent No.: US 12,160,407 B2
(45) Date of Patent: Dec. 3, 2024

(54) METHOD AND APPARATUS FOR DYNAMIC OUTBOUND FIREWALLING VIA DOMAIN NAME SYSTEM (DNS)

(71) Applicant: AppCensus, Inc., El Cerrito, CA (US)

(72) Inventors: Daren Childers, Santa Maria, CA (US); Narseo Vallina-Rodriguez, Madrid (ES); Abhinav Saxena, Calgary (CA); Joel Reardon, Calgary (CA); Robert Richter, Paris (FR); Pietro Francesco Tirenna, Turin (IT); Nathaniel Good, Albany, CA (US); Serge Egelman, Berkeley, CA (US)

(73) Assignee: AppCensus, Inc., Albany, CA (US)

( * ) Notice: Subject to any disclaimer, the term of this patent is extended or adjusted under 35 U.S.C. 154(b) by 75 days.

(21) Appl. No.: 18/045,414

(22) Filed: Oct. 10, 2022

(65) Prior Publication Data

US 2024/0121214 A1 Apr. 11, 2024

(51) Int. Cl.
*H04L 9/40* (2022.01)
*H04L 61/4511* (2022.01)

(52) U.S. Cl.
CPC ...... *H04L 63/0272* (2013.01); *H04L 61/4511* (2022.05); *H04L 63/0236* (2013.01)

(58) Field of Classification Search
CPC .................................................. H04L 61/4511
See application file for complete search history.

(56) References Cited

U.S. PATENT DOCUMENTS

| | | | |
|---|---|---|---|
| 2019/0253385 A1 | 8/2019 | Gurney | |
| 2021/0029074 A1* | 1/2021 | Buck | H04L 63/0236 |
| 2021/0136106 A1* | 5/2021 | Balasubramaniam | H04L 63/0236 |
| 2021/0250349 A1* | 8/2021 | Konda | G16Y 30/10 |
| 2021/0367924 A1 | 11/2021 | Ong | |
| 2022/0103579 A1* | 3/2022 | Shi | H04L 63/0281 |
| 2023/0254277 A1* | 8/2023 | Kalligudd | H04L 12/4641 709/223 |

FOREIGN PATENT DOCUMENTS

EP 3866433 A1 8/2021

OTHER PUBLICATIONS

International Search Report and Written Opinion, PCT App. No. PCT/US2023/072556, Nov. 29, 2023, 12 pages.

* cited by examiner

*Primary Examiner* — Noura Zoubair
(74) *Attorney, Agent, or Firm* — Nicholson, De Vos, Webster & Elliott, LLP

(57) ABSTRACT

A method performed by a computing device for implementing a dynamic outbound firewall. The method includes creating a localhost virtual private network (VPN) service, intercepting, using the localhost VPN service, outbound network traffic originated by the computing device, and responsive to detecting a first domain name service (DNS) query in the intercepted outbound network traffic, converting the DNS query to a first secure DNS query and sending the first secure DNS query to a trusted external DNS recursive resolver using a secure DNS protocol, receiving a first secure DNS response that includes a first DNS resolution result, adding an entry for the first DNS resolution result to a cache, and dropping a first outbound packet detected in the intercepted outbound network traffic based on a determination that the destination of the first outbound packet does not match an entry in the cache.

12 Claims, 4 Drawing Sheets

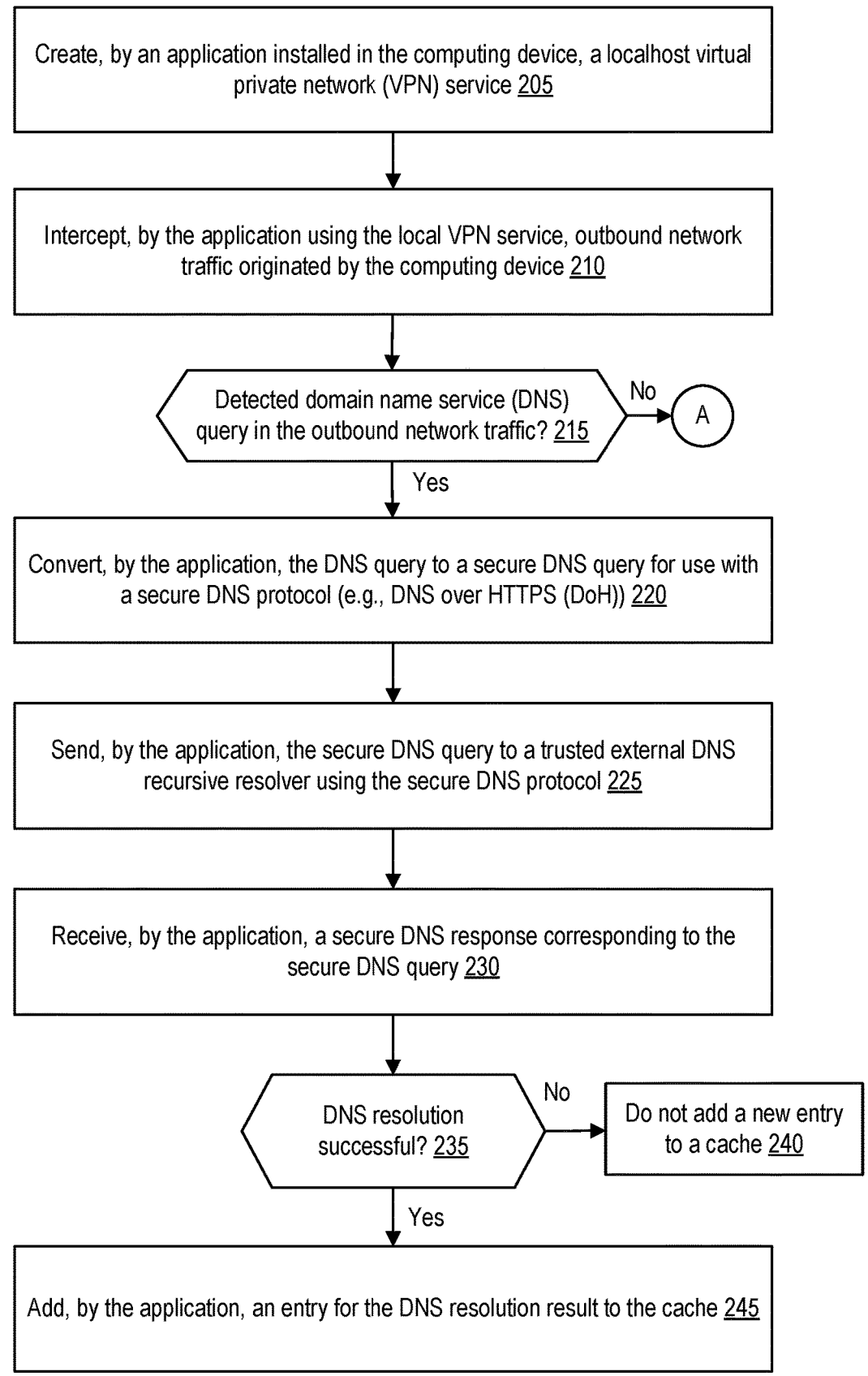

METHOD AND APPARATUS FOR DYNAMIC OUTBOUND FIREWALLING VIA DOMAIN NAME SYSTEM (DNS)

TECHNICAL FIELD

Embodiments of the invention relate to the field of computer network security, and more specifically, to an on-device dynamic outbound firewall leveraging domain name service (DNS).

BACKGROUND

The Domain Name System (DNS) is a hierarchical and decentralized naming system that is used to identify devices reachable through the Internet. DNS is commonly used on the Internet to map human-readable host names to machine-usable IP addresses.

Protective DNS (PDNS) is a security service that analyzes DNS queries against a variety of threat intelligence databases and/or services and implements safeguards to prevent DNS resolutions for destinations that are known to be associated with malicious or suspicious activity. For example, PDNS may analyze a host name included in a DNS query and its associated IP address against a variety of threat intelligence databases and/or services to determine whether the host name or IP address is known to be associated with malicious or suspicious activity. If the host name or IP address is not known to be associated with malicious or suspicious activity, then PDNS may return a DNS response including the DNS resolution result (e.g., the IP address associated with the host name). Otherwise, if the host name or IP address is known to be associated with malicious or suspicious activity, then PDNS may return a DNS response indicating that DNS resolution is being blocked. For example, PDNS may return a NXDOMAIN response indicating that the host name does not exist, a DNS response including the IP address associated with a landing page provided by the PDNS provider, or a DNS response including the IP address associated with a custom landing page that tracks possible malicious activity (and possibly informs the user about the actions being taken).

Enterprises may use PDNS to prevent enterprise devices from connecting to unapproved sites (e.g., malicious, inappropriate, or suspicious sites). One conventional enterprise PDNS solution is to configure enterprise devices to use a public PDNS resolver. However, this solution does not offer any ability to centrally monitor and manage the enterprise devices. Another conventional enterprise PDNS solution is to configure the virtual private network (VPN) settings of enterprise devices to tunnel network traffic to an enterprise VPN endpoint. In doing so, all network traffic or a subset of the network traffic from the enterprise devices goes to a VPN gateway and DNS queries get resolved using that network (acting as if the device is local to that network) or get forwarded outbound from the enterprise network. Such VPN-based PDNS solutions allow cloud-based monitoring and management of enterprise devices but require that all network traffic go through an enterprise tunnel. Another conventional enterprise PDNS solution is to use mobile device management (MDM) software. Mobile device management (MDM) refers to the administration of mobile devices such as smartphones, tablet computers, and laptops. MDM-based PDNS solutions may enforce enterprise device settings to ensure that all traditional DNS queries generated by enterprise devices get resolved at the correct DNS resolvers and allow enterprise device monitoring and management without having to redirect network traffic. However, none of the conventional enterprise PDNS solutions mentioned above are able to provide on-device detection and filtering of network traffic with unresolved destinations. Conventional enterprise PDNS solutions rely on DNS to block undesirable network connections and thus can be bypassed by not using DNS (e.g., by resolving host names via a means other than the operating system (OS) kernel or using a hard coded IP address). With the conventional enterprise PDNS solutions mentioned above, network traffic with unresolved destinations are able to leave an enterprise device, which may pose a security threat to the enterprise device and/or the enterprise network.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
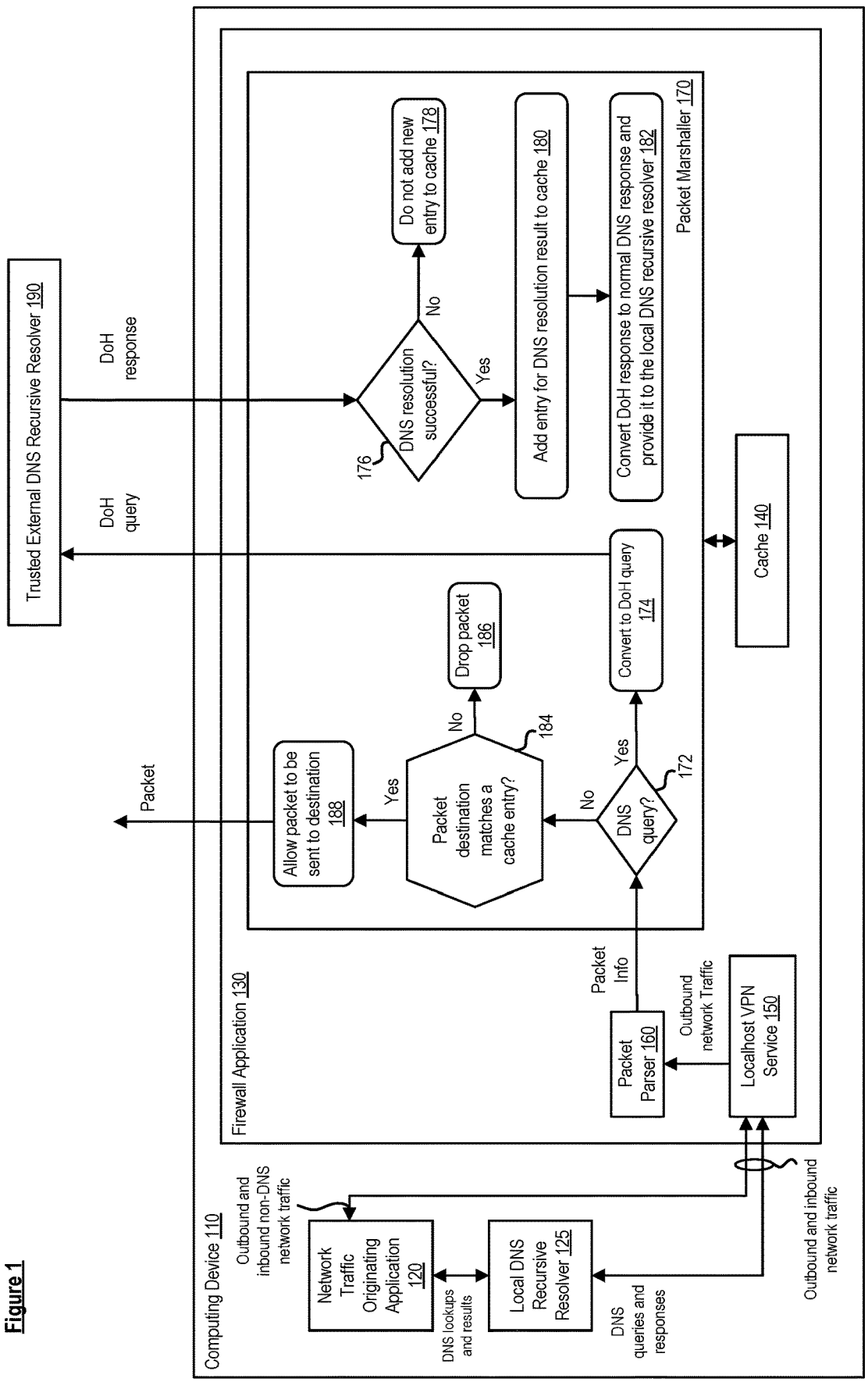
FIG. 1 is a diagram showing a computing device having installed thereon a firewall application for implementing a dynamic outbound firewall, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Modern smartphone platforms such as Android® implement a permission-based model to regulate access to these sensitive resources and data by third-party applications. The Android® permissions system has evolved over the years from an ask-on-install approach to an ask-on-first-use approach. While this change impacts when permissions are granted and how users can use contextual information to reason about the appropriateness of a permission request, the backend enforcement mechanisms have remained largely unchanged.

As mentioned above, conventional enterprise Protective Domain Name System (PDNS) solutions are not able to provide on-device detection and filtering of network traffic with unresolved destinations. Network traffic with unresolved destinations may represent 1) an attempt to resolve a host name via a means other than the operating system (OS) kernel or 2) a hard-coded Internet Protocol (IP) address within the application generating network traffic. With the conventional enterprise PDNS solutions mentioned above, network traffic with unresolved destinations are able to leave an enterprise device, which may pose a security threat to the enterprise device and/or the enterprise network.

Embodiments disclosed herein provide a so called "firewall" application that can be installed on a computing device to implement a dynamic outbound firewall that leverages Domain Name System (DNS) to determine which network traffic is allowed to leave the computing device. When installed on the computing device, the firewall application may create a localhost VPN service to marshal all outbound network traffic generated by the computing device (e.g., outbound network traffic generated by any of the applications installed on the computing device) to the firewall application. The firewall application may use the localhost virtual private network (VPN) to intercept outbound network traffic. If the firewall application detects a DNS query in the outbound network traffic, the firewall application may convert the DNS query to a secure DNS query for use with a secure DNS protocol (e.g., DNS over Hypertext Transfer Protocol Secure (HTTPS) (DoH)) and send the secure DNS query to a trusted external DNS recursive resolver using the secure DNS protocol. If DNS resolution is successful, then the firewall application adds an entry for the DNS resolution result to a local cache of approved destinations. The cache entry may include the host name and associated network address (e.g., IP address) included in the DNS resolution result. If the DNS resolution is unsuccessful (e.g., the DNS response received from the trusted external DNS recursive resolver indicates that DNS resolution is being blocked or the host name could not be resolved), then the firewall application does not add a new entry to the cache. If the firewall application detects a (non-DNS) outbound packet in the outbound network traffic, the firewall application may determine whether the destination of the outbound packet is approved based on determining whether the destination matches an existing entry in the cache (e.g., by checking whether the destination host name and destination network address of the outbound packet matches the host name and network address included in any one of the cache entries). If the firewall application determines that the destination is approved (e.g., because the destination matches an entry in the cache or the destination is included in a preconfigured allow list), then the firewall application may allow the outbound packet to be sent to its destination. Otherwise, if the firewall application determines that the destination is not approved (e.g., because the destination does not match an entry in the cache or the destination is included in a preconfigured deny list), then the firewall application may drop the outbound packet. In this way, the firewall application may only allow (non-DNS) outbound packets with destinations that match an entry in the cache (or destinations that are otherwise explicitly approved) to leave the computing device, and may drop all other packets. Embodiments make use of the localhost VPN service and the trusted external DNS recursive resolver to implement an outbound firewall on the computing device that filters network traffic with unresolved destinations. The firewall application may run entirely in user space so it does not require having super-user privileges, a rooted/jailbroken device, or a custom operating system (OS) image.

An embodiment is a method performed by a computing device for implementing a dynamic outbound firewall. The method includes creating, by an application installed in the computing device, a localhost VPN service, intercepting, by the application using the localhost VPN service, outbound network traffic originated by the computing device, detecting, by the application, a first DNS query in the intercepted outbound network traffic, responsive to detecting the first DNS query, converting the first DNS query to a first secure DNS query for use with a secure DNS protocol and sending, by the application, the first secure DNS query to a trusted external DNS recursive resolver using the secure DNS protocol, receiving, by the application, a first secure DNS response corresponding to the first secure DNS query, wherein the first secure DNS response includes a first DNS resolution result, adding, by the application, an entry for the first DNS resolution result to a cache, detecting, by the application, a first outbound packet in the intercepted outbound network traffic, determining, by the application, that a destination of the first outbound packet is not approved based on a determination that the destination of the first outbound packet does not match an entry in the cache, and dropping, by the application, the first outbound packet in response to the determination that the destination of the first outbound packet is not approved. The method may further include detecting, by the application, a second outbound packet in the intercepted outbound network traffic, determining, by the application, that a destination of the second outbound packet is approved based on a determination that the destination of the second outbound packet matches the entry for the first DNS resolution result, and allowing, by the application, the second outbound packet to be sent out of the computing device in response to the determination that the destination of the second outbound packet is approved. Embodiments are further described herein with reference to the accompanying figures.

FIG. 1 is a diagram showing a computing device having installed thereon a firewall application for implementing a dynamic outbound firewall, according to some embodiments. As shown in the diagram, the computing device 110 includes a network traffic originating application 120, a local DNS recursive resolver 125, and a firewall application 130. In an embodiment, the computing device 110 is a mobile device such as a smartphone or tablet, and the network traffic originating application 120 and the firewall application 130 are mobile apps. However, it should be understood that the computing device 110 can be a non-mobile device in some embodiments. For example, the computing device 110 may be a desktop computer, a server computer, a laptop, or a smart television (TV).

The network traffic originating application 120 may be any type of application installed on the computing device 110 that generates outbound network traffic (e.g., network traffic that is to leave the computing device 110). In an embodiment, the network traffic originating application 120 is a web browser.

The local DNS recursive resolver 125 is a DNS recursive resolver implemented by the computing device 110, often as part of an operating system (OS) installed on the computing device 110 (e.g., by a Linux kernel). The local DNS recursive resolver 125 may receive requests from applications to perform a DNS lookup and provide DNS lookup results to those applications. When the local DNS recursive resolver 125 receives a request to perform a DNS lookup, it may check its own cache to see if it has the corresponding DNS record. If the local DNS recursive resolver 125 does not have the corresponding DNS record in its cache, it may generate a DNS query to send to an external DNS recursive resolver. In typical DNS setups, the local DNS recursive resolver 125 sends the DNS query to a DNS recursive resolver of an Internet Service Provider (ISP) (as defined in the DNS settings). It should be noted that the DNS queries generated by the local DNS recursive resolver 125 are often in plaintext and unencrypted. Also, it should be noted that some ISP recursive resolvers are not trustworthy.

The firewall application 130 is an application installed on the computing device 110 that, as will be described in further detail here, implements a dynamic outbound firewall that leverages DNS to determine which network traffic is allowed to leave the computing device 110. The firewall application 130 may create a localhost VPN service 150 in the computing device 110. Unlike traditional VPN services that have tunnels that terminate at a remote computing device, the localhost VPN service 150 may have a tunnel that terminates at the firewall application 130. Thus, the firewall application 130 may use the localhost VPN service to intercept network traffic leaving the computing device 110 (outbound network traffic) and/or network traffic entering the computing device 110 (inbound network traffic). The localhost VPN service 150 may be configured in user space. Thus, the localhost VPN service 150 provides a means for the firewall application 130 to intercept outbound and/or inbound network traffic without having to root the computing device 110 and/or without having super-user privileges. The localhost VPN service 150 may be protocol agnostic in that it can be used to intercept various types of network traffic regardless of the protocol used.

During operation, the network traffic originating application 120 may invoke the local DNS recursive resolver 125 to perform a DNS lookup (e.g., to resolve a host name). If the local DNS recursive resolver 125 has the corresponding DNS record in its cache, then the local DNS recursive resolver 125 may provide the DNS lookup result directly to the network traffic originating application 120 without generating a DNS query. Otherwise, if the local DNS recursive resolver 125 does not have the corresponding DNS record in its cache, then the local DNS recursive resolver 125 may generate a DNS query to send to an external DNS recursive resolver.

Also, during operation, the network traffic originating application 120 may generate non-DNS outbound network traffic. The outbound network traffic may include one or more outbound packets. Each outbound packet may include one or more headers that indicate the destination of the outbound packet. For example, an outbound packet may include an IP header that indicates the destination IP address of the outbound packet. The outbound packet may further indicate the destination port of the outbound packet (e.g., in a TCP header), the destination host name (e.g., in an HTTP header), and/or a server name indication (SNI) (e.g., in a Transport Layer Security (TLS) header). The destination of an outbound packet may be identified by the destination network address and port, the destination network address by itself, or the destination network address and destination host name/SNI. It should be understood that the destination of an outbound packet can be identified using other suitable means.

As shown in the diagram, the firewall application 130 includes a packet parser 160, a packet marshaller 170, and a cache of approved destinations 140 (cache 140 is separate from the cache used by local DNS recursive resolver 125). The firewall application 130 may use the localhost VPN service 150 to intercept outbound network traffic generated by the computing device 110 and provide the intercepted outbound network traffic to the packet parser 160. The outbound network traffic may include packets representing DNS queries (e.g., generated by the local DNS recursive resolver 125) and/or non-DNS outbound packets (e.g., generated by the network traffic originating application 120).

The packet parser 160 may parse the headers (and possibly the payload) of an outbound packet to extract various information about the outbound packet such as the destination network address, the transport layer protocol (e.g., TCP or UDP), the destination port, and the destination host name. The packet parser 160 may provide the extracted packet information to the packet marshaller 170.

As will be described in further detail herein, the packet marshaller 170 may perform operations for enforcing the use of a trusted external DNS recursive resolver 190 and filtering network traffic with unresolved destinations. Example operations of the packet marshaller 170 are shown in the diagram and further described herein below.

In an embodiment, as shown in the diagram, at operation 172, the packet marshaller 170 receives information regarding an outbound packet ("packet information") from the packet parser 160 and determines whether the outbound packet represents a DNS query based on the packet information. For example, the packet marshaller 170 may determine that the outbound packet represents a DNS query if the TCP or UDP port field of the header is set to 53, although other means of determining whether an outbound packet represents a DNS query are possible. If the packet represents a DNS query, at operation 174, the packet marshaller 170 converts the DNS query to a DoH query and sends the DoH query to the trusted external DNS recursive resolver 190. DoH is a protocol for performing DNS resolution via HTTPS. One goal of DoH is to increase user privacy and security by preventing eavesdropping and manipulation of DNS data by man-in-the-middle attacks by using HTTPS to encrypt the data between the DoH client and the DoH-based DNS resolver. While DoH is used in this example, other embodiments may use a different type of secure DNS protocol such as DNS over Transport Layer Security (DoT) or DNS over Quick UDP Internet Connections (QUIC). As used herein, a secure DNS protocol refers to a DNS protocol that uses some form of encryption to provide a layer of security. The trusted external DNS recursive resolver 190 may be a DNS recursive resolver that is trusted by the network administrator of the enterprise interested in securing the computing device 110.

Upon receiving the DoH query, the trusted external DNS recursive resolver 190 may attempt to perform DNS resolution to resolve the host name included in the DoH query to a network address and send a DoH response corresponding to the DoH query to the firewall application 130. The trusted external DNS recursive resolver 190 may implement protective DNS (PDNS) or a similar service and thus only provide a valid DNS resolution result in the DoH response if the trusted external DNS recursive resolver 190 determines that the host name and/or its associated network address is approved. Otherwise, if the trusted external DNS recursive resolver 190 determines that the host name and/or its associated network address is not approved (e.g., because it is associated with malicious or suspicious activity or a security policy (e.g., a parental control filter) indicates that it is not approved), then the trusted external DNS recursive resolver 190 may provide an indication in the DoH response that DNS resolution is being blocked (e.g., by indicating that the host name does not exist (e.g., a NXDOMAIN response) or by including an IP address associated with a default/custom landing page).

The firewall application 130 may receive the DoH response and provide the DoH response to the packet marshaller 170. At operation 176, the packet marshaller 170 determines whether DNS resolution was successful based on the DoH response. If the DNS resolution was successful (the DoH response included a valid DNS resolution result), then at operation 180, the packet marshaller 170 adds an entry for the DNS resolution result to the cache of approved destinations 140. In an embodiment, the entry for the DNS resolution result includes the network address (e.g., an IP address) included in the DNS resolution result. In an embodiment, the entry for the DNS resolution result includes the host name and network address included in the DNS resolution result. That is, the entry for the DNS resolution result may include a host name and network address tuple. More generally, an entry for a DNS resolution result (in the cache of approved destinations 140) may include any of the values included in the DoH response (or any values derived therefrom) and/or additional values designated by an administrator. For example, an entry in the cache 140 may include allowable port numbers designated by an administrator.

At operation 182, the packet marshaller 170 converts the DoH response to a normal DNS response (e.g., plaintext and unencrypted) and provides this DNS response to the local DNS recursive resolver 182. In an embodiment, the packet marshaller 170 may manipulate the time-to-live (TTL) value included in the DoH response when converting the DoH response to a normal DNS response such that the TTL value included in the normal DNS response is different from the TTL value included in the DoH response.

Returning to operation 176, if the packet marshaller 170 determines that DNS resolution was unsuccessful (e.g., the DoH response indicates that DNS resolution is being blocked), then at operation 178, the packet marshaller 170 does not add a new entry to the cache of approved destinations 140.

As a result of the operations described above, the packet marshaller 170 adds an entry to the cache 140 if DNS resolution was successful. However, the packet marshaller 170 does not add a new entry in the cache if DNS resolution was unsuccessful.

With the operations described above, the packet marshaller 170 in effect "forces" the use of a secure DNS protocol (e.g., DoH) with a trusted external DNS recursive resolver 190 (instead of using plaintext DNS resolutions to ISP-defined resolvers as happens today in most networks).

Returning to operation 172, if the packet marshaller 170 determines that the outbound packet does not represent a DNS query, then at operation 184, the packet marshaller 170 determines whether the destination of the outbound packet matches an entry in the cache 140. In an embodiment, the destination of an outbound packet is identified by the destination network address. In another embodiment, the destination of an outbound packet is identified by a destination host name and destination network address tuple. It should be understood that the destination of an outbound packet may be identified and matched against entries in the cache 140 using other values as well (e.g., port number). If the destination of the packet matches an entry in the cache of approved destinations 140, then this indicates that DNS resolution was successful for this destination, and thus this destination is considered as being approved/trustworthy. Thus, at operation 188, the packet marshaller 170 allows the outbound packet to be sent to the destination (the outbound packet is allowed to leave the computing device 110).

Returning to operation 172, if the destination of the outbound packet does not match an entry in the cache 140, then this indicates that successful DNS resolution for this destination has not occurred (the destination is an unresolved destination), and thus this destination is considered as not being approved. Thus, at operation 186, the packet marshaller 170 drops the outbound packet (so that it does not leave the computing device 110).

In an embodiment, the packet marshaller 170 determines whether the destination of the outbound packet matches a particular entry in the cache 140 by determining whether the destination network address matches a network address included in the cache entry. As is known in the art, it is possible for a single network address (e.g., a single IP address) to host multiple sites (e.g., this is common when using serverless functions and content delivery networks (CDNs)). Thus, it might not be sufficient to only match the destination network address against the cache. For example, the packet marshaller 170 may add an entry to the cache 140 for a network address associated with a non-malicious first site if DNS resolution is successful. However, if there is a malicious second site hosted at the same network address and the packet marshaller 170 only checks the destination network address of outbound packets against the cache 140, then the packet marshaller 170 may end up allowing outbound packets destined for the malicious site to leave the computing device 110 due to the presence of the cache entry for the (shared) network address. Thus, to address this problem, in an embodiment, entries in the cache 140 include a host name and network address tuple, and the packet marshaller 170 matches the destination host name (or Server Name indication (SNI)) and destination network address of an outbound packet against the cache to determine whether the destination is approved. The matching can be performed for every packet or only for new flows/streams. SNI is an extension to the Transport Layer Security (TLS) computer networking protocol by which a client indicates which host name it is attempting to connect to at the start of the handshaking process. This allows a server to present one of multiple possible certificates on the same IP address and TCP port number and hence allows multiple secure (HTTPS) websites (or any other service over TLS) to be served by the same IP address without requiring all those sites to use the same certificate. Matching SNI may only work for new flows/streams since TLS only sends the "ClientHello" message when establishing a new session. If the destination is approved for a new flow/stream (e.g., because the destination SNI and the destination network address of the TLS "ClientHello" message match the host name and network address included in a cache entry), then packet marshaller 170 may allow any subsequent outbound packets belonging to the same flow/stream to leave the computing device 110. A packet fingerprint (e.g., which can be determined based on extracting certain information from the packets or from the application that originated the packets) may be used to identify outbound packets that belong to the flow/stream.

In an embodiment, entries in the cache of approved destinations 140 can expire. In an embodiment, an entry in the cache of approved destinations 140 includes a TTL value or similar value that indicates when the entry expires. In an embodiment, the TTL value in a cache entry for a DNS resolution result is set to be the same as the TTL value included in the DNS resolution result but other TTL values are possible. In an embodiment, the packet marshaller 170 determines whether an entry in the cache 140 has expired when accessing that entry (e.g., as part of accessing the cache 140 to determine whether a destination of an outbound packet is approved or not). The packet marshaller 170 may delete the entry from the cache 140 if the packet marshaller 170 determines that the entry has expired (e.g., based on the TTL value included in the entry). In an embodiment, the packet marshaller 170 or a background process periodically (e.g., every N minutes) determines whether any entries in the cache 140 have expired (e.g., based on the TTL values included in the entries) and deletes any expired entries. If an entry in the cache 140 has expired, then a new DoH query may have to be sent to the trusted external DNS recursive resolver 190 to add the entry back to the cache 140. In an embodiment, the packet marshaller 170 identifies entries in the cache 140 that are about to expire and preemptively sends DoH queries for those entries to the trusted external DNS recursive resolver 190 (to automatically renew those entries).

In an embodiment, since the packet marshaller 170 has control over the DNS responses provided to the local DNS recursive resolver 125, the packet marshaller 170 may manipulate the network address (or other content) included in the DNS responses provided to the local DNS recursive resolver 125 (e.g., such that the values/content of the DNS responses provided to the local DNS recursive resolve 125 is different from the values/content included in the DoH response received from the trusted external DNS recursive resolver 190). For example, the packet marshaller 170 may include in a DNS response provided to the local DNS recursive resolver 125 a network address hosting an internal web page indicating that access is not allowed (e.g., if the DoH response indicated that DNS resolution was unsuccessful). As another example, the packet marshaller 170 may implement a rule that certain host names are to automatically be translated to a predefined network address.

In an embodiment, the packet marshaller 170 maintains an allow list in addition to the cache 140. The allow list may include a list of destinations that are pre-approved without having to be resolved by the trusted external DNS recursive resolver 190. This allows network traffic to be sent to destinations that might not get resolved but that the computing device 110 has to be able to access. The packet marshaller 170 may allow any outbound packets with a destination that is included in the allow list to be sent out of the computing device 110 without having to check the cache of approved destinations 140.

In an embodiment, the packet marshaller 170 maintains a deny list. The deny list may include a list of destinations that are not approved regardless of whether they can be resolved by the trusted external DNS recursive resolver 190 or not. The packet marshaller 170 may drop any outbound packets with a destination that is included in the deny list.

An example scenario is now described to illustrate an embodiment. The network traffic originating application 120 may include an embedded analytics software development kit (SDK) that is configured to send data to a remote server associated with the host name "api.spyonyou.com." The network traffic originating application 120 may perform a DNS lookup for the "api.spyonyou.com" host name, which causes a DNS query to be generated. The firewall application 130 may intercept this DNS query before it leaves the computing device 110 using the localhost VPN service 150. The firewall application 130 may convert the DNS query to an equivalent DoH query and send the DoH query to the trusted external DNS recursive resolver 190 using DoH. In this example, it is assumed that the trusted external DNS recursive resolver 190 determines that the "api.spyonyou.com" host name is not approved (e.g., because it is associated with malicious activity) and thus returns a DoH response indicating that the host name does not exist (e.g., a NXDOMAIN response). As a result, the firewall application 130 does not add an entry to the cache 140. As such, the firewall application 130 will drop any packets destined for the remote server.

Another example scenario is now described to illustrate an embodiment. The network traffic originating application 120 may be configured to establish a connection with a remote server associated with the host name "api.conglomo.com." The network traffic originating application 120 may perform a DNS lookup for the "api.conglomo.com" host name, which causes a DNS query to be generated. The firewall application 130 may intercept this DNS query before it leaves the computing device 110 using the localhost VPN service 150. The firewall application 130 may convert the DNS query to an equivalent DoH query and send the DoH query to the trusted external DNS recursive resolver 190 using DoH. In this example, it is assumed that the trusted external DNS recursive resolver 190 determines that the "api.conglomo.com" host name is approved (e.g., because it is not associated with malicious or suspicious activity) and thus returns a DoH response that includes a valid DNS resolution result (e.g., including the IP address associated with the "api.conglomo.com" host name). As a result, the firewall application 130 adds an entry for the DNS resolution result to the cache 140. Until this cache entry expires (at which point the trusted external DNS recursive resolver 190 may have to be contacted again), the firewall application 130 allows any outbound packets destined for the remote server to leave the computing device 110 (e.g., including outbound packets generated by any of the other applications installed on the same computing device as the network traffic originating application 120, absent the existence of some other filtering rule that would preclude those outbound packets from leaving the computing device 110).

A technological advantage of certain embodiments descried herein is that they provide an on-device firewall solution that does not allow outbound packets to leave the computing device 110 unless the destination is explicitly approved by the trusted external DNS recursive resolver 190 (or otherwise explicitly approved, for example, by an allow list). This minimizes the risks of eavesdropping or traffic interception by untrusted networks or ISPs. The on-device firewall solution enforces the use of a secure DNS protocol (e.g., DoH) and a trusted external DNS recursive resolver 190, which provides additional security.

Conventional on-device outbound firewalls are difficult to maintain because they either require locally-stored static rulesets (which are often incomplete and cannot easily be updated) or remote lookups that incur performance overheads. A technological advantage of certain embodiments described herein is that they avoid the aforementioned drawbacks by dynamically updating the local cache of approved destinations 140 using DNS resolution results provided by the trusted external DNS recursive resolver 190. This allows for providing a dynamic ruleset for an on-device firewall (as opposed to a static ruleset) that is updated using the existing DNS mechanisms/infrastructure (and thus does not require separate remote lookups).

Another technological advantage of certain embodiments described herein is that they operate in user space (the firewall application 130 and the localhost VPN service 150 operate in user space), which allows for simpler deployment (e.g., across enterprise devices) since there is no need for rooting the computing device and no need for having special higher-level privileges to install the firewall application 130 or create/configure the localhost VPN service 150.

In one example use case, an enterprise may require enterprise users to install the firewall application 130 on their devices (e.g., BYOD (bring your own device) devices or enterprise devices roaming on foreign networks) to prevent those devices from accessing malware, phishing websites, and other insecure or inappropriate content.

While a certain arrangement of components is shown in the diagram shown in FIG. 1, it should be understood that the arrangement is provided as an example, and that other embodiments may implement the same or similar functionality using a different arrangement and/or distribute functionality across components in a manner that is different than shown in the diagram.

While a single network traffic originating application 120 is shown in the diagram, the computing device 110 may have more than one network traffic originating application installed on it, and the firewall application 130 may filter outbound network traffic generated by those applications as well. While a single trusted external DNS recursive resolver 190 is shown in the diagram, there can be more than one trusted external DNS recursive resolver 190 (e.g., each having different PDNS services with different rulesets/policies regarding which destinations are approved or not). In an embodiment, the trusted external DNS recursive resolver 190 may provide multiple different PDNS services (e.g., each having different rulesets/policies regarding which destinations are approved or not), and apply different PDNS services to different computing devices.

Figure 2:
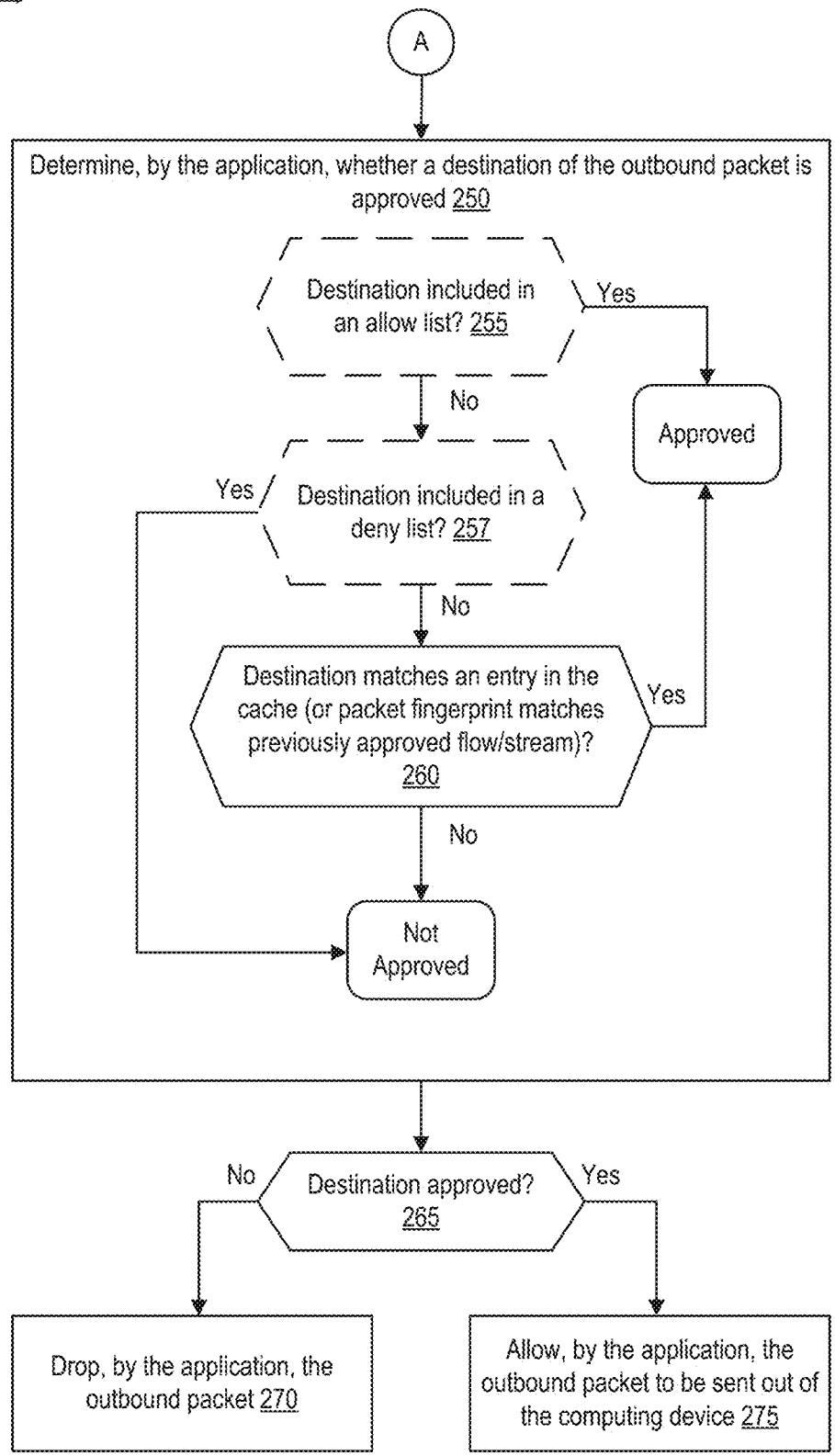
FIG. 2 is a flow diagram showing a method for implementing a dynamic outbound firewall, according to some embodiments.

FIG. 2 is a flow diagram showing a method for implementing a dynamic outbound firewall, according to some embodiments. In an embodiment, the process is performed by a computing device such as the computing device 110 shown in FIG. 1. The process may be implemented using any combination of hardware, software, and firmware. For ease of description, certain operations are described as being performed by the application (e.g., the firewall application 130). Those skilled in the art will understand that this means that the operations are performed by the computing device as a result of executing/running the application.

The operations in the flow diagram are described with reference to the exemplary embodiments of the other diagrams. However, it should be understood that the operations of the flow diagram can be performed by embodiments of the invention other than those discussed with reference to these other diagrams, and the embodiments of the invention discussed with reference to these other diagrams can perform operations different than those discussed with reference to the flow diagram. Also, while the flow diagram shows a particular order of operations performed by certain embodiments, it should be understood that such order is provided by way of example (e.g., alternative embodiments may perform the operations in a different order, combine certain operations, overlap certain operations, etc.).

At operation 205, an application installed in the computing device (e.g., the firewall application 130) creates a localhost VPN service. In an embodiment, the application is executed in a user space of the computing device.

At operation 210, the application intercepts, using the localhost VPN service, outbound network traffic originated by the computing device (e.g., network traffic originated by the network traffic originating application 120 or similar application).

At operation 215, the application determines whether it detected a DNS query in the outbound network traffic. If the application did not detect a DNS query (e.g., the application detected non-DNS network traffic), then the method proceeds to operation 250. Otherwise, if the application detected a DNS query, then the method proceeds to operation 220.

At operation 220, the application converts the DNS query to a secure DNS query for use with a secure DNS protocol. In an embodiment, the secure DNS protocol is any one of: DoH, DoT, and DNS over QUIC.

At operation 225, the application sends the secure DNS query to a trusted external DNS recursive resolver (e.g., that implements PDNS) using the secure DNS protocol.

At operation 230, the application receives a secure DNS response corresponding to the secure DNS query.

At operation 235, the application determines whether DNS resolution was successful. If DNS resolution was unsuccessful (e.g., because the secure DNS response indicates that DNS resolution is being blocked), then the method proceeds to operation 240, where the application does not add a new entry to a cache of approved destinations. Otherwise, if DNS resolution was successful (e.g., because the secure DNS response includes a valid DNS resolution result), then the method proceeds to operation 245, where the application adds an entry for the DNS resolution result to the cache of approved destinations. In an embodiment, the entry for the DNS resolution result includes a network address. In an embodiment, the entry for the DNS resolution result includes a host name and network address tuple.

In an embodiment, the application converts the secure DNS response to a normal (non-secure) DNS response and provides the normal DNS response to a local DNS recursive resolver on the computing device as a response to the DNS query detected in operation 215. In an embodiment, the normal DNS response includes a manipulated TTL value that is different from a TTL value included in the secure DNS response.

Now returning to operation 215, if the application did not detect a DNS query, then this means that the application detected a non-DNS outbound packet, and the method proceeds to operation 250. At operation 250, the application determines whether a destination of the outbound packet is approved. In an embodiment, this involves operations 255-260. In an embodiment where the application implements an allow list, at operation 255, the application determines whether the destination is included in the allow list. If the destination is included in the allow list, then the destination is approved. Otherwise, if the destination is not included in the allow list, then the method proceeds to operation 257 if the application implements a deny list or proceeds to operation 260 if the application does not implement a deny list. At operation 257, the application determines whether the destination is included in the deny list. If the destination is included in the deny list, then the destination is not approved. Otherwise, if the destination is not included in the deny list, then the method proceeds to operation 260.

At operation 260, the application determines whether the destination matches an entry in the cache (or the packet fingerprint of the outbound packet matches the packet fingerprint of a previously approved flow/stream). If the destination matches an entry in the cache (or the packet fingerprint of the outbound packet matches the packet fingerprint of a previously approved flow/stream), then the destination is approved. In an embodiment, if the outbound packet is used to establish a new flow/stream and the destination matches an entry in the cache (which means that the flow/stream is approved), then the application generates a packet fingerprint for the flow/stream and remembers this packet fingerprint (which uniquely identifies packets belonging to the flow/stream) to be able to identify any subsequent outbound packets belonging to the same flow/stream (e.g., the packet fingerprint may be used in operation 260). This may be useful, for example, in cases where certain destination information such as SNI is only included in the initial packet but not necessarily included in subsequent packets belonging to the same flow/stream. Returning to operation 260, if the destination does not match an entry in the cache (and the packet fingerprint does not match a previously approved flow/stream), then the destination is not approved.

In an embodiment, the application determines that the destination of an outbound packet matches an entry in the cache based on a determination that the destination network address of the outbound packet matches the network address included the cache entry. In an embodiment, the application determines that the destination of an outbound packet matches an entry in the cache based on a determination that the destination host name and destination network address of the outbound packet matches the host name and network address included the cache entry, respectively.

At operation 265, the application determines whether the destination is approved. If the destination is not approved, then at operation 270, the application drops the outbound packet (so as to prevent the outbound packet from leaving the computing device). Otherwise, if the destination is approved, then at operation 275, the application allows the outbound packet to be sent out of the computing device.

In an embodiment, the application deletes the entry for the DNS resolution result from the cache in response to a determination that the entry for the DNS resolution result has expired.

Figure 3:
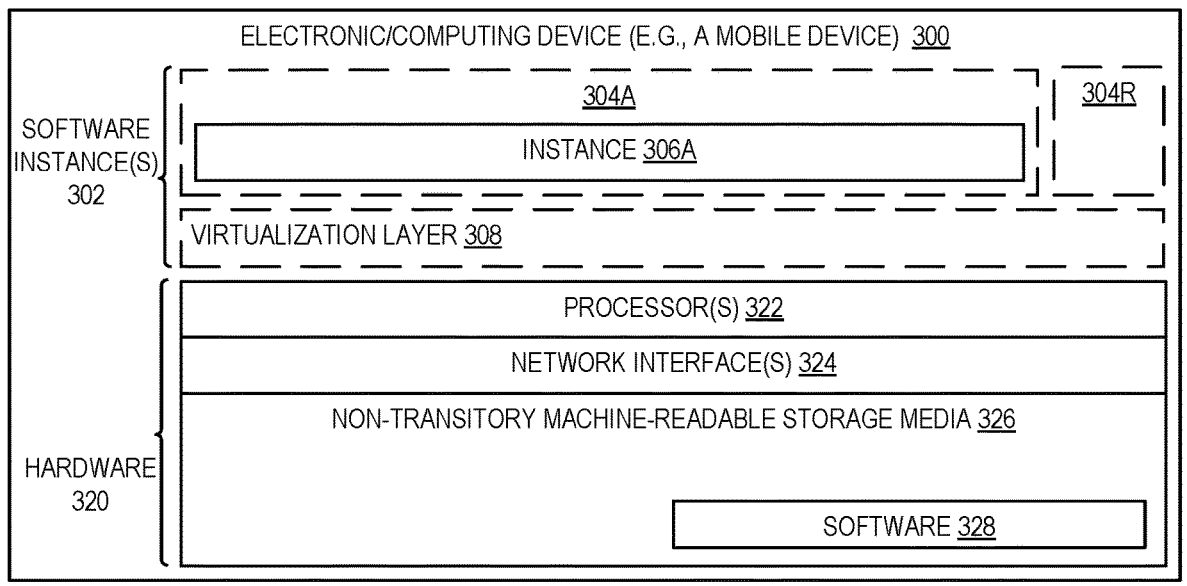
FIG. 3 is a block diagram illustrating an electronic/computing device, according to some embodiments.

FIG. 3 is a block diagram illustrating an electronic/computing device, according to some embodiments. FIG. 3 illustrates hardware 320 comprising a set of one or more processor(s) 322, a set of one or more network interfaces 324 (wireless and/or wired), and non-transitory machine-readable storage medium/media 326 having stored therein software 328 (which includes instructions executable by the set of one or more processor(s) 322). Software 328 can include code (e.g., firewall application code), which when executed by hardware 320, causes the electronic device 300 to perform operations of one or more embodiments described herein (e.g., operations for implementing an on-device dynamic outbound firewall).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage medium/media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a computing device to implement a dynamic outbound firewall, the method comprising:

creating, by an application installed in the computing device, a localhost traffic interception service;

intercepting, by the application using the localhost traffic interception service, outbound network traffic originated by the computing device;

detecting, by the application, a first domain name service (DNS) query in the intercepted outbound network traffic;

responsive to detecting the first DNS query, converting the first DNS query to a first secure DNS query for use with a secure DNS protocol and sending, by the application, the first secure DNS query to a trusted external DNS recursive resolver using the secure DNS protocol;

receiving, by the application, a first secure DNS response corresponding to the first secure DNS query, wherein the first secure DNS response includes a first DNS resolution result;

adding, by the application, an entry for the first DNS resolution result to a cache of approved destinations that is maintained by the application and that is separate from a DNS cache that is maintained at the computing device to perform DNS lookups, wherein the entry for the first DNS resolution result includes a first network address and a first host name;

detecting, by the application, a first outbound packet belonging to a first flow in the intercepted outbound network traffic;

determining, by the application, that a destination of the first outbound packet is not approved based on a determination that the destination of the first outbound packet does not match an entry in the cache, wherein the cache includes the entry for the first DNS resolution result and one or more other entries for successful DNS resolution results provided by the trusted external DNS recursive resolver to the application;

dropping, by the application, the first outbound packet in response to the determination that the destination of the first outbound packet is not approved;

detecting, by the application, a second outbound packet belonging to a second flow in the intercepted outbound network traffic;

determining, by the application, that a destination of the second outbound packet is approved based on a determination that the destination of the second outbound packet matches the entry for the first DNS resolution result, wherein the determination that the destination of the second outbound packet matches the entry for the first DNS resolution result is based on a determination that a destination network address of the second outbound packet matches the first network address and a destination host name of the second outbound packet matches the first host name; and allowing, by the application, the second outbound packet to be sent out of the computing device in response to the determination that the destination of the second outbound packet is approved.

2. The method of claim 1, further comprising:

detecting, by the application, a third outbound packet belonging to a third flow in the intercepted outbound network traffic;

determining, by the application, that a destination of the third outbound packet is approved based on a determination that the destination of the third outbound packet is included in an allow list that is separate from the cache; and allowing, by the application, the third outbound packet to be sent out of the computing device in response to the determination that the destination of the third outbound packet is approved.

3. The method of claim 1, further comprising:

detecting, by the application, a third outbound packet in the intercepted outbound network traffic;

determining, by the application, that a destination of the third outbound packet is not approved based on a determination that the destination of the third outbound packet is included in a deny list; and dropping, by the application, the third outbound packet in response to the determination that the destination of the second outbound packet is not approved.

4. The method of claim 1, wherein the secure DNS protocol is any one of: DNS over Hypertext Transfer Protocol Secure (HTTPS), DNS over Transport Layer Security (TLS), and DNS over Quick UDP Internet Connections (QUIC).

5. The method of claim 1, further comprising:

converting, by the application, the first secure DNS response to a first DNS response; and providing, by the application, the first DNS response to a local DNS recursive resolver as a response to the first DNS query.

6. The method of claim 5, wherein the first DNS response includes a manipulated time-to-live value that is different from a time-to-live value included in the first secure DNS response.

7. The method of claim 1, further comprising:

deleting, by the application, the entry for the first DNS resolution result from the cache in response to a determination that the entry for the first DNS resolution result has expired.

8. The method of claim 1, further comprising:

detecting, by the application, a second DNS query in the intercepted outbound network traffic;

responsive to detecting the second DNS query, converting the second DNS query to a second secure DNS query for use with the secure DNS protocol and sending, by the application, the second secure DNS query to the trusted external DNS recursive resolver using the secure DNS protocol; and receiving, by the application, a second secure DNS response corresponding to the second secure DNS query, wherein a new entry is not added to the cache as a result of receiving the second secure DNS response because the second secure DNS response indicates that a DNS resolution is being blocked.

9. The method of claim 1, wherein the application is executed in a user space of the computing device.

10. A set of one or more non-transitory machine-readable storage media storing instructions which, when executed by one or more processors of a computing device, causes the computing device to perform operations for implementing a dynamic outbound firewall, the operations comprising:

creating, by an application installed in the computing device, a localhost traffic interception service;

intercepting, by the application using the localhost traffic interception service, outbound network traffic originated by the computing device;

detecting, by the application, a first domain name service (DNS) query in the intercepted outbound network traffic;

responsive to detecting the first DNS query, converting the first DNS query to a first secure DNS query for use with a secure DNS protocol and sending, by the application, the first secure DNS query to a trusted external DNS recursive resolver using the secure DNS protocol;

receiving, by the application, a first secure DNS response corresponding to the first secure DNS query, wherein the first secure DNS response includes a first DNS resolution result;

adding, by the application, an entry for the first DNS resolution result to a cache of approved destinations that is maintained by the application and that is separate from a DNS cache that is maintained at the computing device to perform DNS lookups, wherein the entry for the first DNS resolution result includes a first network address and a first host name;

detecting, by the application, a first outbound packet belonging to a first flow in the intercepted outbound network traffic;

determining, by the application, that a destination of the first outbound packet is not approved based on a determination that the destination of the first outbound packet does not match an entry in the cache, wherein the cache includes the entry for the first DNS resolution result and one or more other entries for successful DNS resolution results provided by the trusted external DNS recursive resolver to the application;

dropping, by the application, the first outbound packet in response to the determination that the destination of the first outbound packet is not approved;

detecting, by the application, a second outbound packet belonging to a second flow in the intercepted outbound network traffic;

determining, by the application, that a destination of the second outbound packet is approved based on a determination that the destination of the second outbound packet matches the entry for the first DNS resolution result, wherein the determination that the destination of the second outbound packet matches the entry for the first DNS resolution result is based on a determination that a destination network address of the second outbound packet matches the first network address and a destination host name of the second outbound packet matches the first host name; and allowing, by the application, the second outbound packet to be sent out of the computing device in response to the determination that the destination of the second outbound packet is approved.

11. The set of one or more non-transitory machine-readable storage media of claim 10, wherein the operations further comprise:

detecting, by the application, a third outbound packet belonging to a third flow in the intercepted outbound network traffic;

determining, by the application, that a destination of the third outbound packet is approved based on a determination that the destination of the third outbound packet is included in an allow list that is separate from the cache; and allowing, by the application, the third outbound packet to be sent out of the computing device in response to the determination that the destination of the third outbound packet is approved.

12. The set of one or more non-transitory machine-readable storage media of claim 10, wherein the secure DNS protocol is any one of: DNS over Hypertext Transfer Protocol Secure (HTTPS), DNS over Transport Layer Security (TLS), and DNS over Quick UDP Internet Connections (QUIC).

* * * * *